United States Patent
Khoshnevisan et al.

(10) Patent No.: US 11,496,968 B2
(45) Date of Patent: Nov. 8, 2022

(54) UPLINK POWER CONTROL PARAMETERS FOR REPETITIONS OF PHYSICAL UPLINK SHARED CHANNEL TRANSMISSIONS

(71) Applicant: QUALCOMM Incorporated, San Diego, CA (US)

(72) Inventors: Mostafa Khoshnevisan, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/248,152

(22) Filed: Jan. 11, 2021

(65) Prior Publication Data

US 2021/0227474 A1 Jul. 22, 2021

Related U.S. Application Data

(60) Provisional application No. 62/962,090, filed on Jan. 16, 2020.

(51) Int. Cl.
*H04W 52/14* (2009.01)
*H04W 72/02* (2009.01)
(Continued)

(52) U.S. Cl.
CPC ......... *H04W 52/146* (2013.01); *H04W 52/08* (2013.01); *H04W 52/242* (2013.01); *H04W 72/02* (2013.01); *H04W 72/0473* (2013.01)

(58) Field of Classification Search
CPC ........... H04W 52/00–60; H04W 52/08; H04W 52/146; H04W 52/242; H04W 72/02; H04W 72/0473
See application file for complete search history.

(56) References Cited

U.S. PATENT DOCUMENTS

| 11,019,607 B2* | 5/2021 | Papasakellariou .... H04L 1/1861 |
| 2013/0128833 A1* | 5/2013 | Lee .................... H04W 52/545 370/329 |

(Continued)

OTHER PUBLICATIONS

Intel Corporation: "Discussion on Remaining Details of UL Power Control for eIMTA Support", 3GPP Draft, 3GPP TSG RAN WG1 Meeting #76, R1-140109, Intel—e IMTA UL PC, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Feb. 10, 2014-Feb. 14, 2014, Feb. 9, 2014 (Feb. 9, 2014), XP050735674, 6 Pages, Retrieved from the Internet: URL: http://www.3gpp.org/ftp/Meetings_3GPP_SYNC/RAN/RAN1/Docs/. [retrieved on Feb. 9, 2014] sections 2, 5, 5.1, 5.2, 5.3.

(Continued)

*Primary Examiner* — Raymond S Dean
(74) *Attorney, Agent, or Firm* — Harrity & Harrity LLP/Qualcomm Incorporated

(57) ABSTRACT

Various aspects of the present disclosure generally relate to wireless communications. In some aspects, a UE may transmit a first repetition of a physical uplink shared channel (PUSCH) communication using a first set of values for a set of uplink power control (ULPC) parameters; and transmit a second repetition of the PUSCH communication using a second set of values for the set of ULPC parameters. Numerous other aspects are provided.

30 Claims, 9 Drawing Sheets

(51) Int. Cl.
 *H04W 72/04* (2009.01)
 *H04W 52/24* (2009.01)
 *H04W 52/08* (2009.01)

(56) References Cited

U.S. PATENT DOCUMENTS

| | | | |
|---|---|---|---|
| 2015/0341866 A1* | 11/2015 | Park | H04L 1/1812 370/280 |
| 2017/0192429 A1* | 7/2017 | Tseng | G05D 1/0088 |
| 2017/0359765 A1* | 12/2017 | Chincholi | H04L 43/16 |
| 2019/0074882 A1* | 3/2019 | Zhou | H04L 5/0053 |
| 2019/0261281 A1* | 8/2019 | Jung | H04W 52/346 |
| 2019/0281588 A1* | 9/2019 | Zhang | H04L 5/0051 |
| 2019/0319823 A1 | 10/2019 | Akkarakaran et al. | |
| 2020/0404655 A1* | 12/2020 | Salem | H04W 72/042 |
| 2021/0084510 A1* | 3/2021 | Ryu | H04W 52/325 |

OTHER PUBLICATIONS

International Search Report and Written Opinion—PCT/US2021/013106—ISA/EPO—dated May 11, 2021.
Qualcomm Incorporated: "Enhancements on Multi-TRP for PDCCH, PUCCH and PUSCH", 3GPP Draft, 3GPP TSG-RAN WG1 Meeting #103-e, R1-2009251, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 24, 2020 (Oct. 24, 2020), XP051946914, 33 Pages, Retrieved from the Internet: URL: https://ftp.3gpp.org/tsg_ran/WG1_RL1/TSGR1_103-e/Docs/R1-2009251.zip. R1-2009251, Enhancements on Multi-TRP for PDCCH, PUCCH and PUSCH.docx [retrieved on Oct. 24, 2020] section 4.

* cited by examiner

| TPC Command Field | Accumulated $S_{PUSCH,b,f,c}$ or $S_{SRS,b,f,c}$ [dB] | Absolute $S_{PUSCH,b,f,c}$ or $S_{SRS,b,f,c}$ [dB] |
|---|---|---|
| 0 | -1 | -4 |
| 1 | 0 | -1 |
| 2 | 1 | 1 |
| 3 | 3 | 4 |

300

```
SRI-PUSCH-PowerControl ::= SEQUENCE {
    sri-PUSCH-PowerControlId           SRI-PUSCH-PowerControlId,
    sri-PUSCH-PathlossReferenceRS-Id   Sequence (SIZE (1...2)) OF   PUSCH-PathlossReferenceRS-Id
    sri-P0-PUSCH-AlphaSetID            Sequence (SIZE (1...2)) OF   P0-PUSCH-AlphaSetID
    sri-PUSCH-ClosedLoopIndex          Sequence (SIZE (1...2)) OF   ENUMERATED {i0, i1}
}
```

FIG. 3D

| TPC command field value | TPC commands to apply for first/ second closed loop index |
|---|---|
| 0 | (-1,0) |
| 1 | (0,-1) |
| 2 | (0,0) |
| 3 | (3,1) |

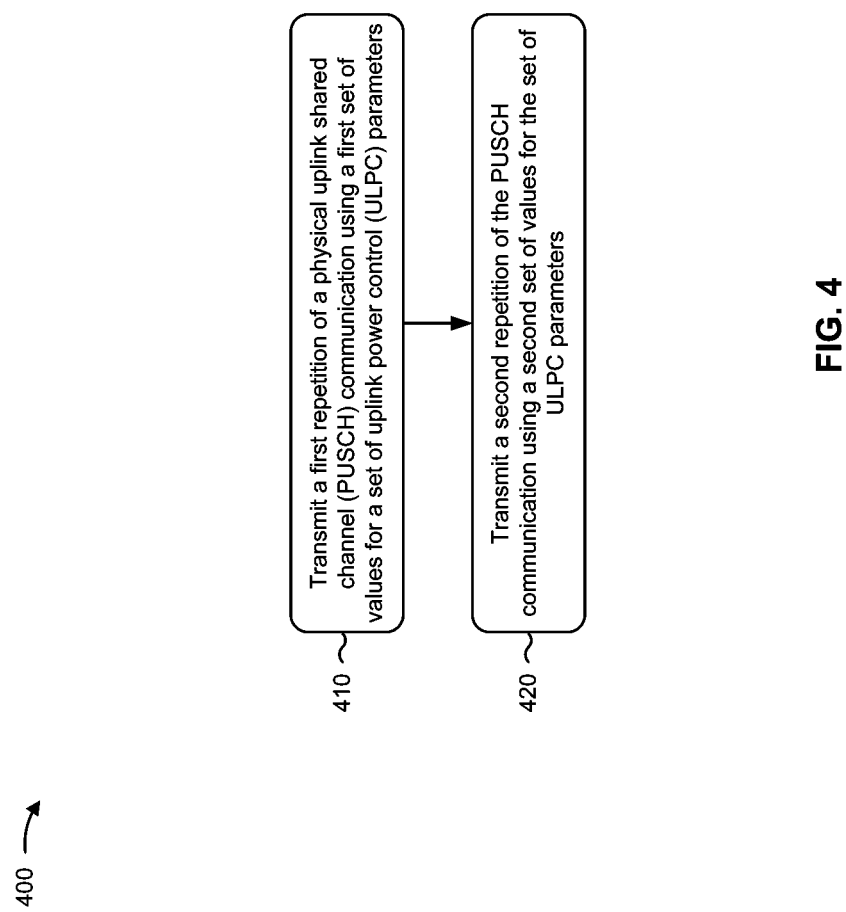

UPLINK POWER CONTROL PARAMETERS FOR REPETITIONS OF PHYSICAL UPLINK SHARED CHANNEL TRANSMISSIONS

CROSS-REFERENCE TO RELATED APPLICATION

This patent application claims priority to Provisional Patent Application No. 62/962,090, filed on 16 Jan. 2020, entitled "UPLINK POWER CONTROL PARAMETERS FOR REPETITIONS OF PHYSICAL UPLINK SHARED CHANNEL TRANSMISSIONS," and assigned to the assignee hereof. The disclosure of the prior application is considered part of and is incorporated by reference in this patent application.

FIELD OF THE DISCLOSURE

Aspects of the present disclosure generally relate to wireless communication and to techniques and apparatuses for configuring uplink power control parameters for repetitions of physical uplink shared channel transmissions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include transmitting (e.g. to a first transmission reception point (TRP)) a first repetition of a physical uplink shared channel (PUSCH) communication using a first set of values for a set of uplink power control (ULPC) parameters; and transmitting (e.g., to a second TRP), a second repetition of the PUSCH communication using a second set of values for the set of ULPC parameters.

In some aspects, a UE for wireless communication may include memory and one or more processors operatively coupled to the memory. The memory and the one or more processors may be configured to transmit (e.g., to a first TRP) a first repetition of a PUSCH communication using a first set of values for a set of ULPC parameters; and transmit (e.g., to a second TRP) a second repetition of the PUSCH communication using a second set of values for the set of ULPC parameters.

In some aspects, a non-transitory computer-readable medium may store one or more instructions for wireless communication. The one or more instructions, when executed by one or more processors of a UE, may cause the UE to: transmit (e.g., to a first TRP) a first repetition of a PUSCH communication using a first set of values for a set of ULPC parameters; and transmit (e.g., to a second TRP) a second repetition of the PUSCH communication using a second set of values for the set of ULPC parameters.

In some aspects, an apparatus for wireless communication may include means for transmitting (e.g., to a first TRP) a first repetition of a PUSCH communication using a first set of values for a set of ULPC parameters; and means for transmitting (e.g., to a second TRP) a second repetition of the PUSCH communication using a second set of values for the set of ULPC parameters.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 3A-3F are diagrams illustrating one or more examples of configuring uplink power control parameters for repetitions of physical uplink shared channel transmissions, in accordance with various aspects of the present disclosure.

FIG. 4 is a diagram illustrating an example process performed, for example, by a user equipment, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented, or a method may be practiced, using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including New Radio (NR) technologies.

Figure 1:
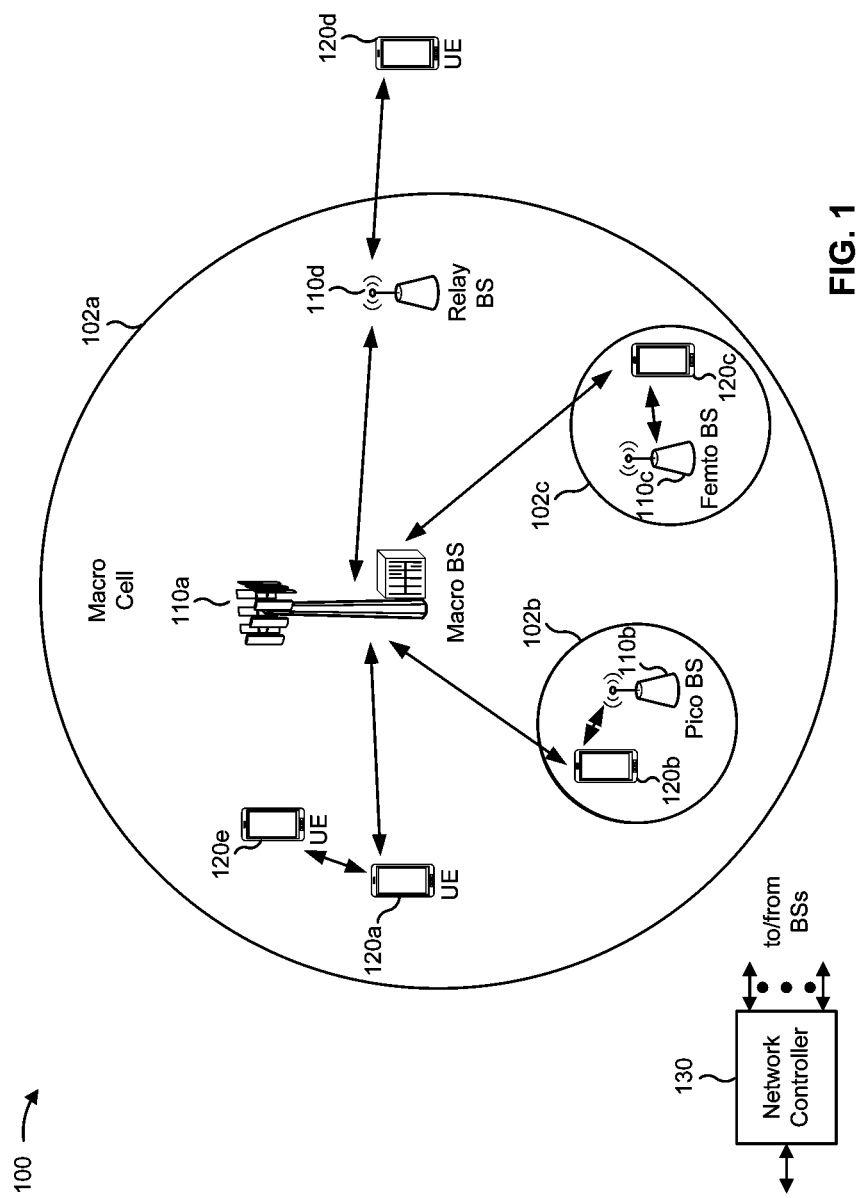
FIG. 1 is a block diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a TRP, and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts)

whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
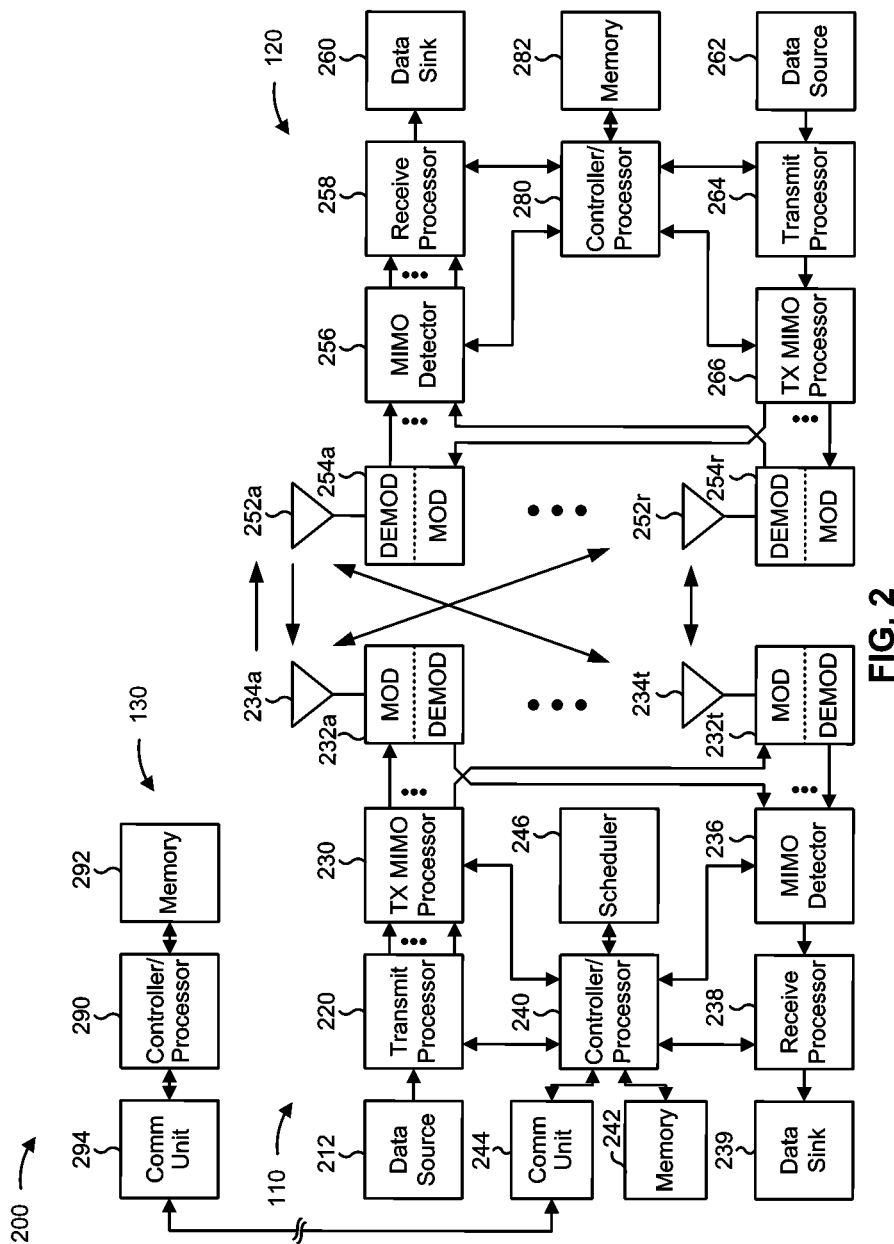
FIG. 2 is a block diagram illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with configuring ULPC parameters for repetitions of physical uplink shared channel transmissions, as described in more detail elsewhere herein. For example, controller/processor 240 of base station 110, controller/processor 280 of UE 120, and/or any other component(s) of FIG. 2 may perform or direct operations of, for example, process 400 of FIG. 4 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 400 of FIG. 4 and/or other processes as described herein. A scheduler 246 may schedule UEs for data transmission on the downlink and/or uplink.

In some aspects, UE 120 may include means for transmitting (e.g., to a first TRP) a first repetition of a PUSCH communication using a first set of values for a set of ULPC parameters; means for transmitting (e.g., to a second TRP) a second repetition of the PUSCH communication using a second set of values for the set of ULPC parameters; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

A UE may configure a set of ULPC parameters for transmitting a PUSCH communication. The UE may select a set of values for the set of ULPC parameters based at least in part on an indicator within a downlink control information (DCI) communication (e.g., a DCI communication that schedules the PUSCH communication). For example, the indicator may be a sounding reference signal (SRS) reference indicator (SRI) power control identifier that is associated with the PUSCH communication.

The UE may transmit repetitions of the PUSCH communication to improve reliability and/or robustness of the PUSCH communication. For example, a BS may configure a UE to transmit a plurality of repetitions of the same PUSCH communication (e.g., a plurality of repetitions of the same PUSCH transport block), where each repetition may be directed to a TRP among a plurality of TRPs in a multi-TRP configuration, an antenna panel among a plurality of antenna panels in a multi-panel configuration, or an antenna among a plurality of antennas in a multi-antenna configuration. Thus, if an access link between the UE and a TRP (or antenna panel or antenna) is blocked such that a repetition transmitted to the TRP is not received, another repetition transmitted to another TRP (or antenna panel or antenna) may be received such that the PUSCH communication can be decoded.

However, in instances where the UE transmits a first set of repetitions to a first TRP (or antenna panel or antenna) and a second set of repetitions to a second TRP (or antenna panel or antenna), the same set of values for the set of ULPC parameters are applied to all of the repetitions regardless of the TRP (or antenna panel or antenna) to which the repetitions are transmitted, a difference in pathloss between transmissions to the first TRP (or antenna panel or antenna) and transmissions to the second TRP (or antenna panel or antenna), and/or the like.

In some aspects described herein, a UE may transmit (e.g., to a first TRP, a first antenna panel, or a first antenna), a first repetition of a PUSCH communication (e.g., associated a transport block) using a first set of values for a set of ULPC parameters. The UE may transmit (e.g., to a second TRP, a second antenna panel, or a second antenna), a second repetition of the PUSCH communication using a second set of values for the set of ULPC parameters. In this way, the UE is able to transmit the first repetition to the first TRP (or antenna panel or antenna) with a set of values for the set of ULPC parameters that are configured for transmitting to the first TRP (or antenna panel or antenna) and to transmit the second repetition to the second TRP (or antenna panel or antenna) with a set of values for the set of ULPC parameters that are configured for transmitting to the second TRP (or antenna panel or antenna). This may conserve power, computing, and/or network resources that may otherwise be consumed by transmitting to each TRP (or antenna panel or antenna), regardless of pathloss or other factors to be considered with configuring the set of ULPC parameters, using the same configuration of values for the set of ULPC parameters.

For ease of explanation, the description to follow will relate to a UE that is configured to transmit a plurality of repetitions of a PUSCH communication to different TRPs in a multi-TRP configuration. It is to be understood that the description equally applies to a UE that is configured to transmit a plurality of repetitions of a PUSCH communication (e.g., of a same transport block) to different antenna panels in a multi-panel configuration and/or different antennas in a multi-antenna configuration.

Figure 3A:
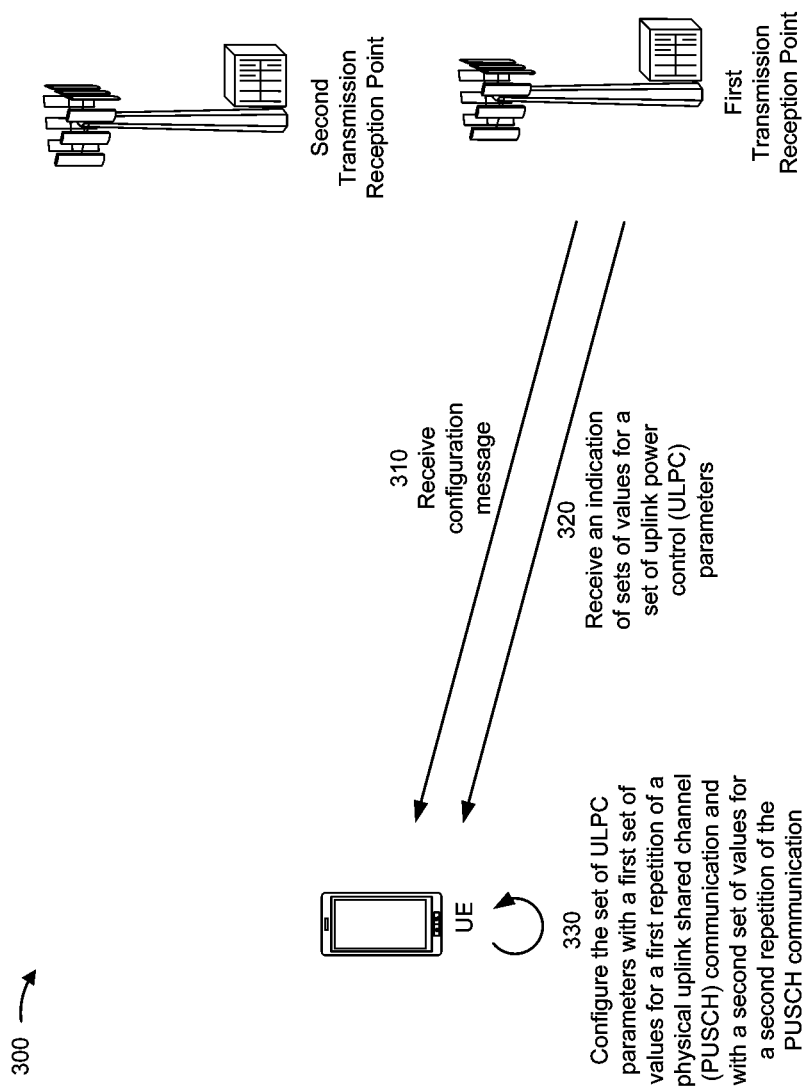
Figure 3B:
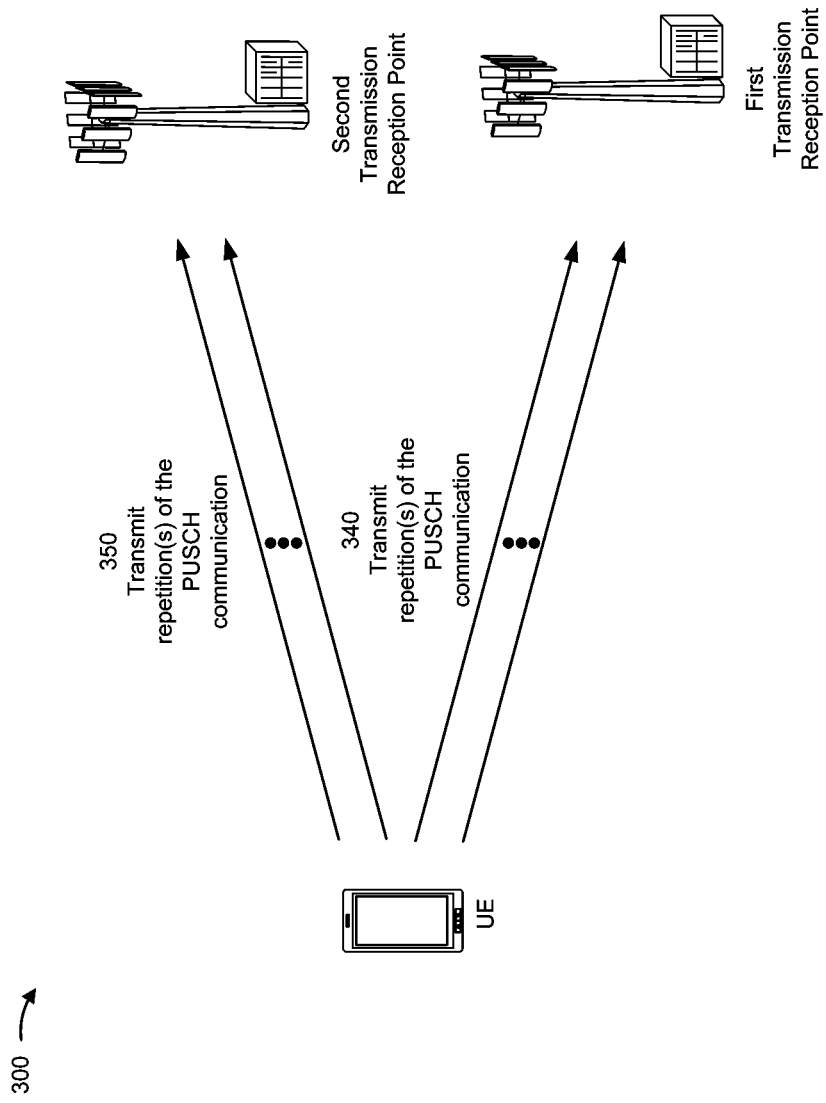

FIGS. 3A and 3B are diagrams illustrating an example 300 of configuring ULPC parameters for repetitions of physical uplink shared channel transmissions, in accordance with various aspects of the present disclosure. FIGS. 3A and 3B show a UE (e.g., UE 120), a first TRP (e.g., base station 110), and a second TRP (e.g., base station 110). In some aspects, the UE, the first TRP, and the second TRP may be included in a network, such as wireless network 100. In some aspects, the UE may communicate with the first TRP or the second TRP on a wireless access link, which may include a downlink and an uplink.

As shown in FIG. 3A, and by reference number 310, the UE may receive a configuration message. In some aspects, the UE receives the configuration message from the first TRP, the second TRP, another TRP of the network, a network controller (e.g., network controller 130), and/or the like.

In some aspects, the configuration message may provide a mapping for a plurality of indications to a plurality of sets of values for a set of ULPC parameters. For example, the mapping may include a set of indications that are mapped to respective sets of candidate values for the set of ULPC parameters. The mapping may indicate that, based at least in part on receiving an indication of the set of indications, the UE is to configure the set of ULPC parameters with a set of values that are mapped to the indication. In some aspects, the mapping may indicate that, based at least in part on receiving an indication (e.g., comprising a first indicator and/or a second indicator) of the set of indications, the UE is to configure the set of ULPC parameters with a first set of values for transmitting a first repetition of a PUSCH communication and to configure the set of ULPC parameters with a second set of values for transmitting a second repetition of the PUSCH communication (e.g., the first repetition and the second repetition may be associated with a single transport block). In some aspects, the indication may include a first indicator that maps to the first set of values and a second indicator that maps to the second set of values.

In some aspects, the set of ULPC parameters may include values for P0, alpha, a pathloss reference signal, a closed loop index, and/or a transmit power control (TPC) command. The set of ULPC parameters may be used in a power control formula to determine a transmission power for transmitting a repetition of the PUSCH communication. In some aspects, P0 may represent a target received power, alpha may represent a compensation factor in a power control formula, and the pathloss reference signal may indicate an amount of pathloss (e.g., an amount of signal power lost during transmission to a TRP). One or more parameters, such as P0, alpha, and/or pathloss (e.g., determined from a pathloss reference signal) may comprise an open loop portion of the ULPC and one or more additional parameters, such as closed loop index and/or TPC command may comprise a closed loop portion of the set of ULPC parameters. The closed loop portion of the set of ULPC parameters may comprise one or more parameters that are based at least in part on information received from the network (e.g., a TRP).

In some aspects, the configuration message may include a configured grant. The configured grant may indicate the first set of values and the second set of values within the configured grant. For example, the configured grant may include an indication (e.g., including a first indicator and a second indicator) mapped to the first set of values and mapped to the second set of values. In some aspects, the configured grant may include the first set of values and the second set of values within the configured grant (e.g., without an indication in a separate (e.g., DCI) communication). For example, the configured grant may indicate a first closed loop index associated with the first set of values and a second closed loop index associated with the second set of values.

In some aspects, the configured grant may be a type 1 configured grant (e.g., provided via radio resource control (RRC) signaling and stored as a configured uplink grant) or a type 2 configured grant (e.g., provided by a communication via a physical downlink control channel, and stored or cleared as a configured uplink grant based at least in part on layer 1 signaling to activate or deactivate the configured uplink grant). In some aspects in which the configured grant is a type 1 configured grant, the configured grant may indicate a first value for a first pathloss reference signal (PL RS) of the first set of values and a second value for a second PL RS of the second set of values.

In some aspects in which the configured grant is a type 2 configured grant, the UE may be configured to receive an indication of a first value for a first PL RS of the first set of values and a second value for a second PL RS of the second set of values. Based at least in part on the indication, the UE may configure the set of ULPC parameters with the first set of values comprising the first value for the first PL RS and configure the set of ULPC parameters with the second set of values comprising the second value for the second PL RS.

As shown by reference number 320, the UE may receive an indication of sets of values for a set of ULPC parameters. In some aspects, the indication may comprise a single DCI communication (e.g., a same DCI communication that schedules the PUSCH communication). In some aspects, the indication may include one or more indicators that map to one or more values for configuring the set of ULPC parameters and/or may indicate whether the UE is to apply the one or more values to the first set of values or the second set of values. For example, a single indicator may identify an entire set of values, a partial set of values, or a single value of a set of values for the set of ULPC parameters.

In some aspects, the indication may include a single SRI power control identifier (e.g., sri-PUSCH-PowerControlId) for the PUSCH communication (e.g., within an SRI field of a DCI communication that schedules the PUSCH communication). The single SRI power control identifier may be mapped to the first set of values and the second set of values for the set of ULPC parameters (e.g., two P0 values, two alpha values, two PL RS values, two closed loop index values, and/or the like).

In some aspects, one or more indications may be mapped (e.g., based at least in part on the configuration message) to a single set of values for the set of ULPC parameters. If the UE receives an indication that maps to a single set of values for the set of ULPC parameters, the UE may apply the single set of values to the first repetition, the second repetition, or both repetitions (e.g., based at least in part on an indicator within the indication, based at least in part on a transmission order of the repetitions, and/or the like).

In some aspects, the UE may be configured to use a first SRS resource and a second SRS resource for transmitting a first SRS communication and a second SRS communication, respectively. In some aspects, each SRS resource may be separately configured with respective sets of values for the set of ULPC parameters. The first SRS resource may be configured to use, for transmitting the first SRS communication, a set of values (e.g., the first set of values) and the second SRS resource may be configured to use, for transmitting the second SRS communication, another set of values (e.g., the second set of values).

In some aspects, the UE may receive the indication to identify the first SRS resource and the second SRS resource. The indication may identify the first SRS resource and the second SRS resource via an SRI field (e.g., an SRI codepoint field) of the DCI. Based at least in part on the indication, the UE may use the first set of values for transmitting the first repetition (e.g., based at least in part on the indication identifying the first SRS resource associated with the first set of values) and the UE may use the second set of values for transmitting the second repetition (e.g., based at least in part on the indication identifying the second SRS resource associated with the second set of values). In this way, an SRI power control identifier is not required for transmitting the PUSCH communication based at least in part on the UE configuring values for the set of ULPC parameters based at least in part on values associated with SRS resources indicated by an SRI field of the DCI.

In some aspects, the first set of values identifies a first closed loop index for the first repetition and the second set of values identifies a second closed loop index for the second repetition. The indication may include a TPC value that indicates a first TPC command associated with the first closed loop index and/or a second TPC command associated with the second closed loop index. For example, the DCI may include the first TPC command in a first set of bits (e.g., a first bit and a second bit) of a DCI field (e.g., a TPC field) and may include the second TPC command in a second set of bits (e.g., a third bit and a fourth bit) of the DCI field (e.g., the TPC field).

As shown by reference number 330, the UE may configure the set of ULPC parameters with the first set of values for the first repetition of the PUSCH communication and with the second set of values for the second repetition of the PUSCH communication.

In some aspects, when the indication comprises a first TPC command associated with the first closed loop index and a second TPC command associated with the second closed loop index, the UE may determine that the first TPC command is associated with the first closed loop index based at least in part on a first indicator of the indication and may determine that the second TPC command is associated with the second closed loop index based at least in part on a second indicator of the indication. In some aspects, the UE may determine that the first TPC command is associated with the first closed loop index based at least in part on the first TPC command being indicated in a first ordered set of bits in a DCI field (e.g., an SRI field) and may determine that the second TPC command is associated with the second closed loop index based at least in part on the second TPC command being indicated in a second ordered set of bits in the DCI field (e.g., an SRI field).

In some aspects, in which a DCI communication (e.g., comprising the indication) comprises a TPC command associated with one of the first closed loop index or the second closed loop index, the UE may determine that the TPC command is associated with one of the first closed loop index or the second closed loop index based at least in part on an indicator in the DCI communication, the first closed loop index being an initial closed loop index in a set of closed loop indexes, and/or the like.

In some aspects, the UE may apply a single TPC command to a first closed loop associated with the first closed loop index and/or to a second closed loop associated with the second closed loop index. In other words, the UE may apply the single TPC command to only one of the closed loops or to both of the closed loops.

In some aspects where the configuration message comprises a configured grant, the UE, based at least in part on the configured grant, may configure the set of ULPC parameters with the first set of values for transmitting the first repetition and may configure the set of ULPC parameters with the second set of values for transmitting the second repetition. In some aspects where the configured grant is a type 1 configured grant, the UE may determine the first set of values (e.g., including a first PL RS) and the second set of values (e.g., including a second PL RS) within the configured grant and/or from another communication from the network. In some aspects where the configured grant is a type 2 configured grant, the UE may determine the first set of values (e.g., including a first PL RS) and the second set of values (e.g., including a second PL RS) based at least in part on an indication of a first value for the first PL RS of the first set of values and a second value for the second PL RS of the second set of values. Based at least in part on the indication, the UE may configure the set of ULPC parameters with the first set of values comprising the first value for the first PL RS and may configure the set of ULPC parameters with the second set of values comprising the second value for the second PL RS.

As shown in FIG. 3B, and by reference number 340, the UE may transmit one or more repetitions of the PUSCH communication to the first TRP based at least in part on values configured for the set of ULPC parameters. For example, the UE may transmit the first repetition of the PUSCH communication to the first TRP using the first set of values for the set of ULPC parameters. As shown by reference number 350, the UE may transmit one or more repetitions (e.g., including the second repetition) of the PUSCH communication to the second TRP based at least in part on values configured for the set of ULPC parameters. For example, the UE may transmit the second repetition of the PUSCH communication to the second TRP using the second set of values for the set of ULPC parameters.

In some aspects, the UE may transmit additional repetitions (e.g., in addition to the first repetition and the second repetition) to the first TRP and/or the second TRP. The UE may use the first set of values and/or the second set of values for the set of ULPC parameters for transmitting the additional repetitions. In some aspects, the UE may select the first set of values or the second set of values for the set of ULPC parameters of a particular additional repetition based at least in part on a mapping of the particular additional repetition of the PUSCH communication to the first set of values (e.g., to the first repetition) or to the second set of values (e.g., to the second repetition). In some aspects, the mapping may be configured based at least in part on a fixed mapping configuration. For example, the UE may use the indication to determine that the UE is to use the first set of values for odd numbered repetitions (e.g., in a sequential order of repetitions) and to use the second set of values for even numbered repetitions (or vice versa). In other words, the UE may alternate between using the first set of values and the second set of values for transmitting successive repetitions of the PUSCH communication. In some aspects, the mapping may be configured based at least in part on RRC signaling, a DCI communication (e.g., dynamically), and/or the like.

Based at last in part on the UE transmitting the first repetition to the first TRP with a set of values for the set of ULPC parameters that are configured for transmitting to the first TRP and transmitting the second repetition to the second TRP with a set of values for the set of ULPC parameters that are configured for transmitting to the second TRP, the UE may conserve power, computing, and/or network resources that may otherwise be consumed by transmitting to each TRP, regardless of pathloss or other factors to be considered with configuring the set of ULPC parameters, using the same configuration of values for the set of ULPC parameters.

Figure 3C:

As shown in FIG. 3C, a TPC command field may include a set of bits (e.g., a set of 2 bits) that can be mapped according to a TPC mapping (e.g., based at least in part on the configuration message). In some aspects, the TPC command may be accumulated (e.g., based at least in part on an adjustment from a previous TPC value). In some aspects, the TPC command may be absolute (e.g., a value that is independent from a previous TPC value). In some aspects, the UE may be configured to interpret a TPC command as accumulated or as absolute based at least in part on configuration information (e.g., within the configuration message). In some aspects, the DCI message may include two TPC command fields (e.g., a TPC command field with 4 bits to receive two TPC command field values in 2-bit portions of the TPC command field).

As shown in FIG. 3D, the configuration message may provide configuration information to map an SRI power control identifier with two sets of values for the set of ULPC parameters. For example, the mapping may include a sequence of values for one or more of the ULPC parameters. In FIG. 3D, sri-PUSCH-PowerControlId refers to an SRI power control identifier, sri-PUSCH-PathlossReferenceRS-Id refers to a PL RS identifier, sri-P0-PUSCH-AlphaSetId refers to a P0 and alpha identifier, and sri-PUSCH-ClosedLoopIndex refers to a closed loop index identifier.

As shown in FIG. 3E, a value in a TPC command field may map to two separate TPC commands based on a mapping that can be configured via RRC signaling, fixed in a protocol, and/or the like. For example, a TPC command field value of 0 may map to TPC commands of (−1,0), a TPC command field value of 1 may map to TPC commands of (0,−1), a TPC command field value of 2 may map to TPC commands of (0,0), and a TPC command field value of 3 may map to TPC commands of (3,1) to apply to the first closed loop index and the second closed loop index.

Figure 3F:
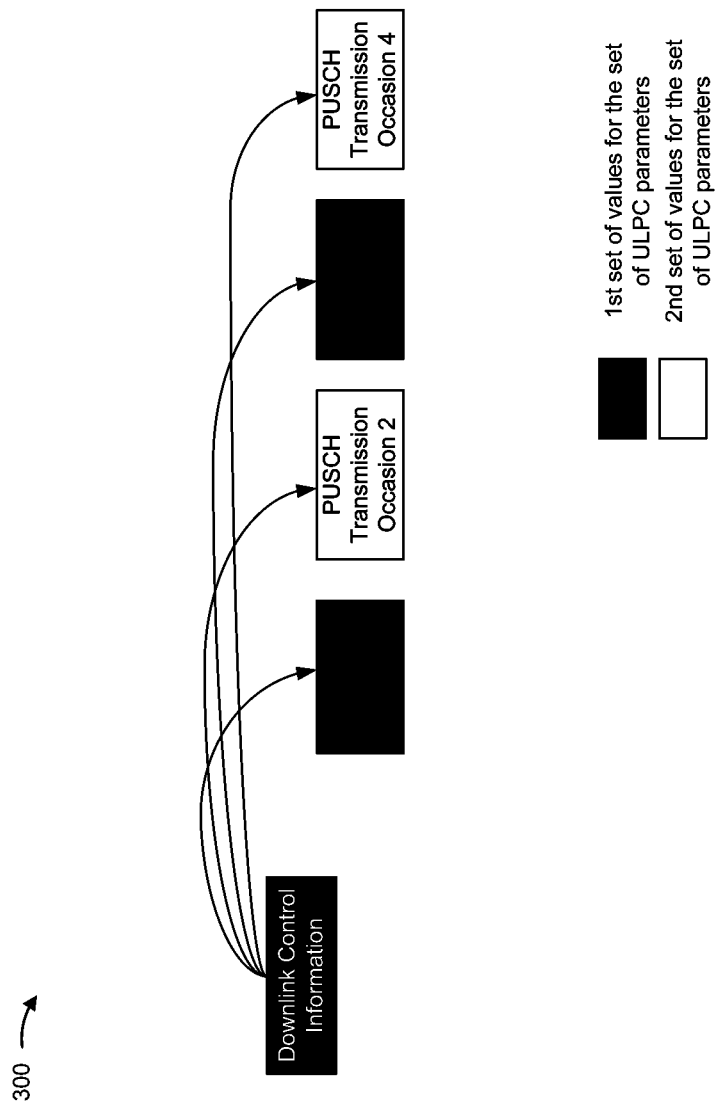

As shown in FIG. 3F, a DCI communication may provide two sets of values for the set of ULPC parameters to apply to a plurality of repetitions. In some aspects, the first set of values for the set of ULPC parameters may apply to a PUSCH transmission occasion 1 and a PUSCH transmission occasion 3. The second set of values for the set of ULPC parameters may apply to a PUSCH transmission occasion 2 and a PUSCH transmission occasion 4. This configuration of alternating between the sets of values for the set of ULPC may be based at least in part on the configuration message (e.g., via RRC signaling). In some aspects, the UE may use another mapping pattern, such as using the first set of values for the set of ULPC parameters for the PUSCH transmission occasions 1 and 2 and the second set of values for the set of ULPC parameters for the PUSCH transmission occasions 3 and 4.

As indicated above, FIGS. 3A-3F are provided as one or more examples. Other examples may differ from what is described with respect to FIGS. 3A-3F.

FIG. 4 is a diagram illustrating an example process 400 performed, for example, by a UE, in accordance with various aspects of the present disclosure. Example process 400 is an example where the UE (e.g., UE 120) performs operations associated with uplink power control parameters for repetitions of physical uplink shared channel transmissions.

As shown in FIG. 4, in some aspects, process 400 may include transmitting a first repetition of a PUSCH communication using a first set of values for a set of ULPC parameters (block 410). For example, the UE (e.g., using controller/processor 280, transmit processor 264, TX MIMO processor 266, MOD 254, antenna 252, and/or the like) may transmit a first repetition of a PUSCH communication using a first set of values for a set of ULPC parameters, as described above.

As further shown in FIG. 4, in some aspects, process 400 may include transmitting a second repetition of the PUSCH communication using a second set of values for the set of ULPC parameters (block 420). For example, the UE (e.g., using controller/processor 280, transmit processor 264, TX MIMO processor 266, MOD 254, antenna 252, and/or the like) may transmit a second repetition of the PUSCH communication using a second set of values for the set of ULPC parameters, as described above.

Process 400 may include additional aspects, such as any single aspect or any combination of aspects described below and/or in connection with one or more other processes described elsewhere herein.

In a first aspect, the first set of values is based at least in part on a pathloss associated with a first pathloss reference signal (PL RS) identification and the second set of values is based at least in part on a pathloss associated with a second PL RS identification.

In a second aspect, alone or in combination with the first aspect, process 400 includes receiving an indication of the first set of values for the first repetition of the PUSCH communication and the second set of values for the second repetition of the PUSCH communication, configuring, based at least in part on the indication, the set of ULPC parameters with the first set of values, and configuring, based at least in part on the indication, the set of ULPC parameters with the second set of values.

In a third aspect, alone or in combination with one or more of the first and second aspects, process 400 includes receiving a configuration message that provides a mapping for a plurality of indications to a plurality of sets of values, wherein configuring the set of ULPC parameters with the first set of values is based at least in part on the mapping, and wherein configuring the set of ULPC parameters with the first set of values is based at least in part on the mapping.

In a fourth aspect, alone or in combination with one or more of the first through third aspects, receiving the indication comprises receiving the indication via a single downlink control information communication, and wherein the indication comprises a single power control identification associated with the first set of values and the second set of values.

In a fifth aspect, alone or in combination with one or more of the first through fourth aspects, the first set of values identifies a first closed loop index for the first repetition, wherein the second set of values identifies a second closed loop index for the second repetition, and wherein the method comprises determining one or more transmission power control (TPC) commands associated with one or more of the first closed loop index value or the second closed loop index value based at least in part on the first closed loop index value being different than the second closed loop index value.

In a sixth aspect, alone or in combination with one or more of the first through fifth aspects, the one or more TPC commands comprises a first TPC command associated with the first closed loop index value and a second TPC command associated with the second closed loop index value.

In a seventh aspect, alone or in combination with one or more of the first through sixth aspects, the first TPC command is determined from a first TPC field of a downlink control information (DCI) communication and the second TPC command is determined from a second TPC field of the DCI communication.

In an eighth aspect, alone or in combination with one or more of the first through seventh aspects, process 400 includes determining that the first TPC field is associated with the first closed loop index value and the second TPC field is associated with the second closed loop index value based at least in part on the first closed loop index value being smaller than the second closed loop index value, or the first closed loop index value being associated with the first repetition and the second closed loop index value being associated with the second repetition.

In a ninth aspect, alone or in combination with one or more of the first through eighth aspects, the first TPC command and the second TPC command are determined from a single TPC field of a DCI communication.

In a tenth aspect, alone or in combination with one or more of the first through ninth aspects, the one or more TPC commands comprises a single TPC command associated with the first closed loop index value based at least in part on one or more of the first closed loop index value being smaller than the second closed loop index value, or the first closed loop index value being associated with the first repetition.

In an eleventh aspect, alone or in combination with one or more of the first through tenth aspects, the one or more TPC commands comprises a single TPC command associated with both the first closed loop index value and the second closed loop index value.

In a twelfth aspect, alone or in combination with one or more of the first through eleventh aspects, process 400 includes transmitting a third repetition of the PUSCH communication using the first set of values or the second set of values for the set of ULPC parameters.

In a thirteenth aspect, alone or in combination with one or more of the first through twelfth aspects, process 400 includes selecting the first set of values or the second set of values for the set of ULPC parameters based at least in part on a mapping of the third repetition of the PUSCH communication to the first set of values or to the second set of values, wherein the mapping is configured based at least in part on radio resource control signaling.

In a fourteenth aspect, alone or in combination with one or more of the first through thirteenth aspects, the first set of values is based at least in part on a pathloss to a first TRP and the second set of values is based at least in part on a pathloss to a second TRP.

In a fifteenth aspect, alone or in combination with one or more of the first through fourteenth aspects, process 400 includes receiving an indication of the first set of values for the first repetition of the PUSCH communication and the second set of values for the second repetition of the PUSCH communication; configuring, based at least in part on the indication, the set of ULPC parameters with the first set of values; and configuring, based at least in part on the indication, the set of ULPC parameters with the second set of values.

In a sixteenth aspect, alone or in combination with one or more of the first through fifteenth aspects, process 400 includes receiving a configuration message that provides a mapping for a plurality of indications to a plurality of sets of values, wherein configuring the set of ULPC parameters with the first set of values is based at least in part on the mapping, and wherein configuring the set of ULPC parameters with the first set of values is based at least in part on the mapping.

In a seventeenth aspect, alone or in combination with one or more of the first through eighteenth aspects, receiving the indication comprises: receiving the indication via a single DCI communication.

In a eighteenth aspect, alone or in combination with one or more of the first through nineteenth aspects, the indication comprises: a single power control identification associated with the first set of values and the second set of values.

In a nineteenth aspect, alone or in combination with one or more of the first through eighteenth aspects, the single power control identification comprises: an SRI value in a DCI communication.

In a twentieth aspect, alone or in combination with one or more of the first through nineteenth aspects, the indication identifies a first SRS resource and a second SRS resource, the first SRS resource is configured to use, for transmitting a first SRS communication, the first set of values, and the second SRS resource is configured to use, for transmitting a second SRS communication, the second set of values.

In a twenty-first aspect, alone or in combination with one or more of the first through twentieth aspects, the indication identifies the first SRS resource and the second SRS resource via an SRI field of the indication.

In a twenty-second aspect, alone or in combination with one or more of the first through twenty-first aspects, the first set of values identifies a first closed loop index for the first repetition and the second set of values identifies a second closed loop index for the second repetition.

In a twenty-third aspect, alone or in combination with one or more of the first through twenty-second aspects, the indication comprises a first TPC command associated with the first closed loop index and a second TPC command associated with the second closed loop index.

In a twenty-fourth aspect, alone or in combination with one or more of the first through twenty-fifth aspects, process 400 includes determining that the first TPC command is associated with the first closed loop index based at least in part on a first indicator of the indication; and determining that the second TPC command is associated with the second closed loop index based at least in part on a second indicator of the indication.

In a twenty-fifth aspect, alone or in combination with one or more of the first through twenty-fourth aspects, receiving the indication comprises receiving a DCI communication, the DCI communication comprises an SRI field, and wherein the SRI field comprises the first indicator and the second indicator.

In a twenty-sixth aspect, alone or in combination with one or more of the first through twenty-fifth aspects, process 400 includes receiving the indication via a DCI communication, wherein the DCI communication comprises a TPC command associated with the first closed loop index.

In a twenty-seventh aspect, alone or in combination with one or more of the first through twenty-sixth aspects, process 400 includes determining that the TPC command is associated with the first closed loop index based at least in part on one or more of: an indicator in the DCI communication, or the first closed loop index being an initial closed loop index in a set of closed loop indexes.

In a twenty-eighth aspect, alone or in combination with one or more of the first through twenty-seventh aspects, process 400 includes applying a single TPC command to a first closed loop associated with the first closed loop index and to a second closed loop associated with the second closed loop index.

In a twenty-ninth aspect, alone or in combination with one or more of the first through twenty-eighth aspects, the indication comprises a TPC value and the TPC value indicates a first TPC command associated with the first closed loop index and a second TPC command associated with the second closed loop index.

In a thirtieth aspect, alone or in combination with one or more of the first through twenty-ninth aspects, process 400 includes transmitting a third repetition of the PUSCH communication using the first set of values or the second set of values for the set of ULPC parameters.

In a thirty-first aspect, alone or in combination with one or more of the first through thirtieth aspects, process 400 includes selecting the first set of values or the second set of values for the set of ULPC parameters based at least in part on a mapping of the third repetition of the PUSCH communication to the first set of values or to the second set of values.

In a thirty-second aspect, alone or in combination with one or more of the first through thirty-first aspects, the mapping is configured based at least in part on one or more of: a fixed mapping configuration, RRC signaling, or a DCI communication.

In a thirty-third aspect, alone or in combination with one or more of the first through thirty-second aspects, the mapping is configured based at least in part on the fixed mapping configuration, and the fixed mapping configuration is based at least in part on alternation between the first set of values and the second set of values.

In a thirty-fourth aspect, alone or in combination with one or more of the first through thirty-third aspects, transmitting the first repetition of the PUSCH communication and transmitting the second repetition of the PUSCH communication comprise: transmitting the first repetition of the PUSCH communication and transmitting the second repetition of the PUSCH communication using communication resources granted as part of a configured grant.

In a thirty-fifth second aspect, alone or in combination with one or more of the first through thirty-fourth aspects, the configured grant indicates the first set of values and the second set of values.

In a thirty-sixth aspect, alone or in combination with one or more of the first through thirty-fifth aspects, the configured grant indicates a first closed loop index associated with the first set of values and a second closed loop index associated with the second set of values.

In a thirty-seventh aspect, alone or in combination with one or more of the first through thirty-sixth aspects, the configured grant is a type 1 configured grant, the ULPC parameters comprise a pathloss reference signal (PL RS), and the configured grant indicates a first value for a first PL RS of the first set of values and a second value for a second PL RS of the second set of values.

In a thirty-eighth aspect, alone or in combination with one or more of the first through thirty-seventh aspects, the configured grant is a type 2 configured grant, the ULPC parameters comprise a pathloss reference signal (PL RS), and the method further comprises: receiving an indication of a first value for a first PL RS of the first set of values and a second value for a second PL RS of the second set of values; configuring, based at least in part on the indication, the set of ULPC parameters with the first set of values comprising the first value for the first PL RS; and configuring, based at least in part on the indication, the set of ULPC parameters with the second set of values comprising the second value for the second PL RS.

In a thirty-ninth aspect, alone or in combination with one or more of the first through thirty-eighth aspects, the set of ULPC parameters includes at least one of: P0, alpha, a pathloss reference signal, a closed loop index, a TPC command, or a combination thereof.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

The following provides an overview of some aspects of the present disclosure:

Aspect 1: A method of wireless communication performed by a user equipment (UE), comprising: transmitting a first repetition of a physical uplink shared channel (PUSCH) communication using a first set of values for a set of uplink power control (ULPC) parameters; and transmitting a second repetition of the PUSCH communication using a second set of values for the set of ULPC parameters.

Aspect 2: The method of aspect 1, wherein the first set of values is based at least in part on a pathloss associated with a first pathloss reference signal (PL RS) identification and the second set of values is based at least in part on a pathloss associated with a second PL RS identification.

Aspect 3: The method of any of aspects 1 or 2, further comprising: receiving an indication of the first set of values for the first repetition of the PUSCH communication and the second set of values for the second repetition of the PUSCH communication; configuring, based at least in part on the indication, the set of ULPC parameters with the first set of values; and configuring, based at least in part on the indication, the set of ULPC parameters with the second set of values.

Aspect 4: The method of aspect 3, further comprising: receiving a configuration message that provides a mapping for a plurality of indications to a plurality of sets of values, wherein configuring the set of ULPC parameters with the first set of values is based at least in part on the mapping, and wherein configuring the set of ULPC parameters with the first set of values is based at least in part on the mapping.

Aspect 5: The method of any of aspects 3 or 4, wherein receiving the indication comprises: receiving the indication via a single downlink control information communication, and wherein the indication comprises a single power control identification associated with the first set of values and the second set of values.

Aspect 6: The method of any of aspects 3 through 5, wherein the first set of values identifies a first closed loop index for the first repetition, wherein the second set of values identifies a second closed loop index for the second repetition, and wherein the method comprises determining one or more transmission power control (TPC) commands associated with one or more of the first closed loop index value or the second closed loop index value based at least in part on the first closed loop index value being different than the second closed loop index value.

Aspect 7: The method of aspect 6, wherein the one or more TPC commands comprises a first TPC command associated with the first closed loop index value and a second TPC command associated with the second closed loop index value.

Aspect 8: The method of aspect 7, wherein the first TPC command is determined from a first TPC field of a downlink control information (DCI) communication and the second TPC command is determined from a second TPC field of the DCI communication.

Aspect 9: The method of aspect 8, further comprising: determining that the first TPC field is associated with the first closed loop index value and the second TPC field is associated with the second closed loop index value based at least in part on: the first closed loop index value being smaller than the second closed loop index value, or the first closed loop index value being associated with the first repetition and the second closed loop index value being associated with the second repetition.

Aspect 10: The method of aspect 7, wherein the first TPC command and the second TPC command are determined from a single TPC field of a DCI communication.

Aspect 11: The method of aspect 6, wherein the one or more TPC commands comprises a single TPC command associated with the first closed loop index value based at least in part on one or more of: the first closed loop index value being smaller than the second closed loop index value, or the first closed loop index value being associated with the first repetition.

Aspect 12: The method of aspect 6, wherein the one or more TPC commands comprises a single TPC command associated with both the first closed loop index value and the second closed loop index value.

Aspect 13: The method of any of aspects 1 through 12, further comprising: transmitting a third repetition of the PUSCH communication using the first set of values or the second set of values for the set of ULPC parameters.

Aspect 14: The method of aspect 13, further comprising: selecting the first set of values or the second set of values for the set of ULPC parameters based at least in part on a mapping of the third repetition of the PUSCH communication to the first set of values or to the second set of values, wherein the mapping is configured based at least in part on radio resource control signaling.

Aspect 15: An apparatus for wireless communication at a device, comprising a processor; memory coupled with the processor; and instructions stored in the memory and executable by the processor to cause the apparatus to perform the method of one or more aspects of aspects 1-14.

Aspect 16: A device for wireless communication, comprising a memory and one or more processors coupled to the memory, the memory and the one or more processors configured to perform the method of one or more aspects of aspects 1-14.

Aspect 17: An apparatus for wireless communication, comprising at least one means for performing the method of one or more aspects of aspects 1-14.

Aspect 18: A non-transitory computer-readable medium storing code for wireless communication, the code comprising instructions executable by a processor to perform the method of one or more aspects of aspects 1-14.

Aspect 19: A non-transitory computer-readable medium storing a set of instructions for wireless communication, the set of instructions comprising one or more instructions that, when executed by one or more processors of a device, cause the device to perform the method of one or more aspects of aspects 1-14.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based at least in part on" is intended to mean "based, at least in part, on" unless explicitly stated otherwise.

What is claimed is:

1. A user equipment (UE) for wireless communication, comprising:
    a memory; and
    one or more processors coupled to the memory, the one or more processors configured to:
        transmit a first repetition of a physical uplink shared channel (PUSCH) communication using a first set of values for a set of uplink power control (ULPC) parameters; and
        transmit a second repetition of the PUSCH communication using a second set of values for the set of ULPC parameters,
        wherein at least one of:
            the first set of values is based at least in part on a pathloss associated with a first pathloss reference signal (PL RS) identification, or
            the second set of values is based at least in part on a pathloss associated with a second PL RS identification.

2. The UE of claim 1, wherein the first set of values is based at least in part on the pathloss associated with the first PL RS identification and the second set of values is based at least in part on the pathloss associated with a second PL RS identification.

3. The UE of claim 1, wherein the one or more processors are further configured to:
receive an indication of the first set of values for the first repetition of the PUSCH communication and the second set of values for the second repetition of the PUSCH communication;
configure, based at least in part on the indication, the set of ULPC parameters with the first set of values; and
configure, based at least in part on the indication, the set of ULPC parameters with the second set of values.

4. The UE of claim 3, wherein the one or more processors are further configured to:
receive a configuration message that provides a mapping for a plurality of indications to a plurality of sets of values,
wherein configuring the set of ULPC parameters with the first set of values is based at least in part on the mapping, and
wherein configuring the set of ULPC parameters with the second set of values is based at least in part on the mapping.

5. The UE of claim 3, wherein the one or more processors, when receiving the indication, are configured to:
receive the indication via a single downlink control information communication, and
wherein the indication comprises a single power control identification associated with the first set of values and the second set of values.

6. The UE of claim 3, wherein the first set of values identifies a first closed loop index value for the first repetition,
wherein the second set of values identifies a second closed loop index value for the second repetition, and
wherein the one or more processors are further configured to:
determine one or more transmission power control (TPC) commands associated with one or more of the first closed loop index value or the second closed loop index value based at least in part on the first closed loop index value being different than the second closed loop index value.

7. The UE of claim 6, wherein the one or more TPC commands comprises a first TPC command associated with the first closed loop index value and a second TPC command associated with the second closed loop index value.

8. The UE of claim 7, wherein the first TPC command is determined from a first TPC field of a downlink control information (DCI) communication and the second TPC command is determined from a second TPC field of the DCI communication.

9. The UE of claim 8, wherein the one or more processors are further configured to:
determine that the first TPC field is associated with the first closed loop index value and the second TPC field is associated with the second closed loop index value based at least in part on:
the first closed loop index value being smaller than the second closed loop index value, or
the first closed loop index value being associated with the first repetition and the second closed loop index value being associated with the second repetition.

10. The UE of claim 7, wherein the first TPC command and the second TPC command are determined from a single TPC field of a DCI communication.

11. The UE of claim 6, wherein the one or more TPC commands comprises a single TPC command associated with the first closed loop index value based at least in part on one or more of:
the first closed loop index value being smaller than the second closed loop index value, or
the first closed loop index value being associated with the first repetition.

12. The UE of claim 6, wherein the one or more TPC commands comprises a single TPC command associated with both the first closed loop index value and the second closed loop index value.

13. The UE of claim 1, wherein the one or more processors are further configured to:
transmit a third repetition of the PUSCH communication using the first set of values or the second set of values for the set of ULPC parameters.

14. The UE of claim 13, wherein the one or more processors are further configured to:
select the first set of values or the second set of values for the set of ULPC parameters based at least in part on a mapping of the third repetition of the PUSCH communication to the first set of values or to the second set of values,
wherein the mapping is configured based at least in part on radio resource control signaling.

15. A method of wireless communication performed by a user equipment (UE), comprising:
transmitting a first repetition of a physical uplink shared channel (PUSCH) communication using a first set of values for a set of uplink power control (ULPC) parameters; and
transmitting a second repetition of the PUSCH communication using a second set of values for the set of ULPC parameters,
wherein at least one of:
the first set of values is based at least in part on a pathloss associated with a first pathloss reference signal (PL RS) identification, or
the second set of values is based at least in part on a pathloss associated with a second PL RS identification.

16. The UE of claim 1, wherein the first set of values is based at least in part on the pathloss associated with the first PL RS identification and the second set of values is based at least in part on the pathloss associated with a second PL RS identification.

17. The method of claim 15, further comprising:
receiving an indication of the first set of values for the first repetition of the PUSCH communication and the second set of values for the second repetition of the PUSCH communication;
configuring, based at least in part on the indication, the set of ULPC parameters with the first set of values; and
configuring, based at least in part on the indication, the set of ULPC parameters with the second set of values.

18. The method of claim 17, further comprising:
receiving a configuration message that provides a mapping for a plurality of indications to a plurality of sets of values,
wherein configuring the set of ULPC parameters with the first set of values is based at least in part on the mapping, and
wherein configuring the set of ULPC parameters with the second set of values is based at least in part on the mapping.

19. The method of claim 17, wherein receiving the indication comprises: receiving the indication via a single downlink control information communication, and
wherein the indication comprises a single power control identification associated with the first set of values and the second set of values.

20. The method of claim 17, wherein the first set of values identifies a first closed loop index value for the first repetition,
wherein the second set of values identifies a second closed loop index value for the second repetition, and
wherein the method further comprises determining one or more transmission power control (TPC) commands associated with one or more of the first closed loop index value or the second closed loop index value based at least in part on the first closed loop index value being different than the second closed loop index value.

21. The method of claim 20, wherein the one or more TPC commands comprises a first TPC command associated with the first closed loop index value and a second TPC command associated with the second closed loop index value.

22. The method of claim 21, wherein the first TPC command is determined from a first TPC field of a downlink control information (DCI) communication and the second TPC command is determined from a second TPC field of the DCI communication.

23. The method of claim 22, further comprising:
determining that the first TPC field is associated with the first closed loop index value and the second TPC field is associated with the second closed loop index value based at least in part on:
the first closed loop index value being smaller than the second closed loop index value, or
the first closed loop index value being associated with the first repetition and the second closed loop index value being associated with the second repetition.

24. The method of claim 21, wherein the first TPC command and the second TPC command are determined from a single TPC field of a DCI communication.

25. The method of claim 20, wherein the one or more TPC commands comprises a single TPC command associated with the first closed loop index value based at least in part on one or more of:
the first closed loop index value being smaller than the second closed loop index value, or
the first closed loop index value being associated with the first repetition.

26. The method of claim 20, wherein the one or more TPC commands comprises a single TPC command associated with both the first closed loop index value and the second closed loop index value.

27. The method of claim 15, further comprising:
transmitting a third repetition of the PUSCH communication using the first set of values or the second set of values for the set of ULPC parameters.

28. The method of claim 27, further comprising:
selecting the first set of values or the second set of values for the set of ULPC parameters based at least in part on a mapping of the third repetition of the PUSCH communication to the first set of values or to the second set of values,
wherein the mapping is configured based at least in part on radio resource control signaling.

29. A non-transitory computer-readable medium storing a set of instructions for wireless communication, the set of instructions comprising:
one or more instructions that, when executed by one or more processors of a user equipment (UE), cause the UE to:
transmit a first repetition of a physical uplink shared channel (PUSCH) communication using a first set of values for a set of uplink power control (ULPC) parameters; and
transmit a second repetition of the PUSCH communication using a second set of values for the set of ULPC parameters,
wherein at least one of:
the first set of values is based at least in part on a pathloss associated with a first pathloss reference signal (PL RS) identification, or
the second set of values is based at least in part on a pathloss associated with a second PL RS identification.

30. An apparatus for wireless communication, comprising:
means for transmitting a first repetition of a physical uplink shared channel (PUSCH) communication using a first set of values for a set of uplink power control (ULPC) parameters; and
means for transmitting a second repetition of the PUSCH communication using a second set of values for the set of ULPC parameters,
wherein at least one of:
the first set of values is based at least in part on a pathloss associated with a first pathloss reference signal (PL RS) identification, or
the second set of values is based at least in part on a pathloss associated with a second PL RS identification.

* * * * *